D. F. HITT.
Surveyor's Plotting Instrument.
No. 200,060. Patented Feb. 5, 1878.
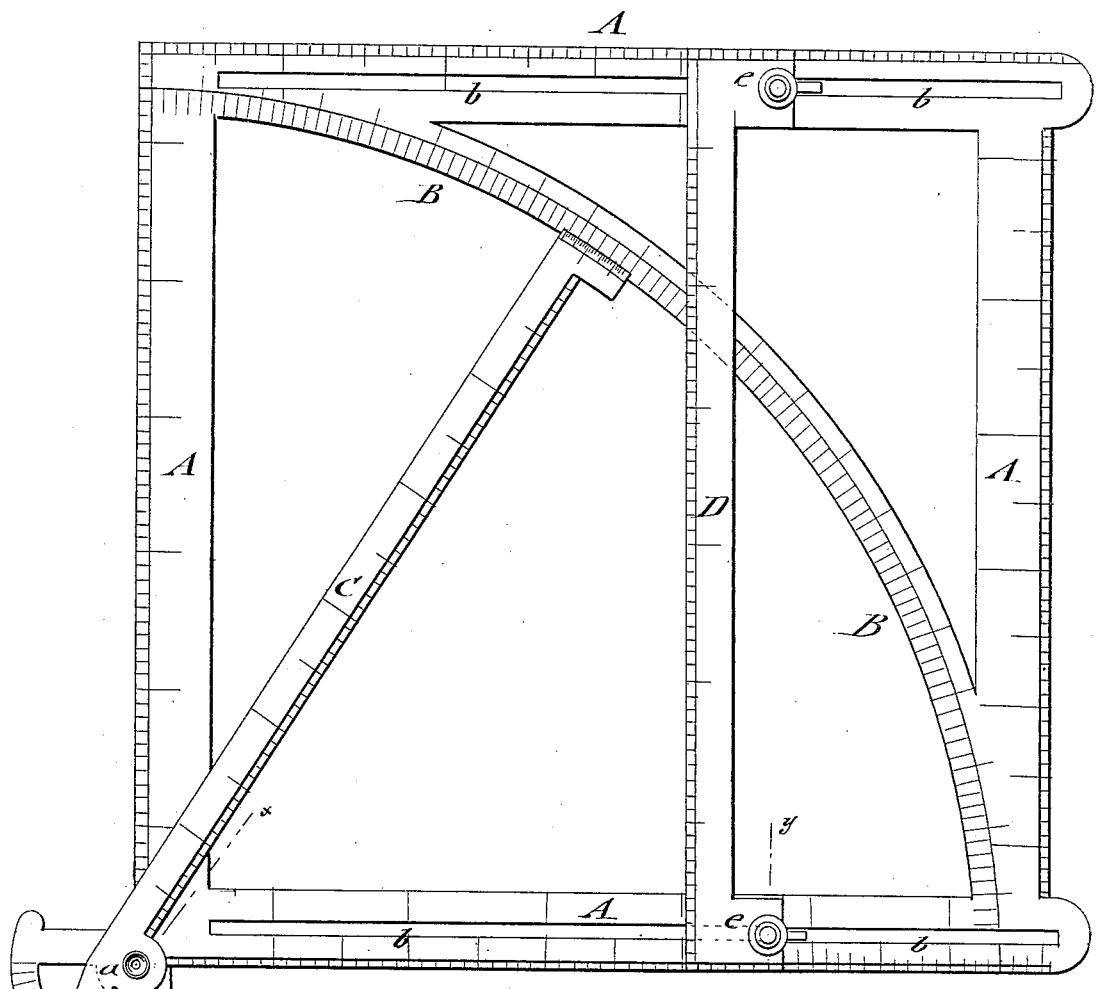
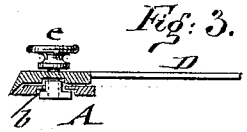

UNITED STATES PATENT OFFICE.

DANIEL F. HITT, OF OTTAWA, ILLINOIS.

IMPROVEMENT IN SURVEYORS' PLOTTING-INSTRUMENTS.

Specification forming part of Letters Patent No. 200,060, dated February 5, 1878; application filed October 22, 1877.

*To all whom it may concern:*

Be it known that I, DANIEL F. HITT, of Ottawa, in the county of La Salle and State of Illinois, have invented a new and useful Improvement in Surveyors' Plotting-Instruments, of which the following is a specification:

In the accompanying drawing, Figure 1 represents a top view of my improved surveyor's plotting-instrument; and Figs. 2 and 3 are detail vertical sections of parts of the same on lines $x\ x$ and $y\ y$, Fig. 1.

Similar letters of reference indicate corresponding parts.

The object of this invention is to furnish to surveyors and others an improved device for plotting their field-notes in quick and accurate manner, one instrument combining protractor, triangles, and scales, and admitting at the same time the reading off of the latitudes and departure for each station, for the computation of the area, without the use of the transverse tables.

The invention consists of a square frame, having two slotted sides and an adjustable bar or sliding scale secured thereto, and clamped by means of screws, which enter the slots.

The sides of the frame and the body and ends of the sliding scale are graduated in suitable manner, for convenient and accurate relative adjustment thereof.

I will proceed to describe my invention in connection with other parts—namely, a quadrant and pivoted hypotenuse—which are necessary in practical operation.

Referring to the drawing, A represents the outer square frame, which is made of wood, steel, or other metal, and provided with a quadrant, B, of a circle, that is described so as to connect two opposite corners.

The quadrant B is preferably made in one piece with the square frame, or otherwise rigidly secured thereto.

The frame A is provided with two movable scales, C and D, of which the hypotenuse-scale C is pivoted to a sleeve, $a$, at the center of the quadrant, at the corresponding corner of the frame, while the second or lateral scale D extends across the frame A, and slides in slots $b$ at opposite sides of the same.

The hypotenuse-scale C is extended back of the pivot-sleeve, and clamped by a set-screw, $d$, to a small quadrant, B', arranged outside of frame A, concentric to the pivot of scale C.

The frame A and scales C D are graduated in any suitable manner at one or both sides, and the quadrant divided into ninety degrees in both directions, each degree being divided into minutes and seconds, if the size of the device allows it.

The hypotenuse-scale C is extended up to the quadrant, and adjusted along the same, being provided with a vernier at the end, to be set to any angle with the sides of the frame, admitting the accurate setting or reading of any angle in degrees, minutes, and seconds.

The lateral scale D is also provided with a vernier at each end, so as to read off at the slotted side scales of frame A the exact length to which the scale is adjusted thereon. The lateral scale D is also clamped by set-screws $e$ to frame A after the scale has been adjusted.

The instrument is used for plotting the bearings from station to station, by setting one of the sides of the frame to the station and the hypotenuse-scale to the required angle along the quadrant, which acts as the protractor.

The distances between the stations are laid off along the hypotenuse-scale after the scale is clamped to the required angle, and the scale then moved out of the way, and the lateral scale set accurately to the station so obtained, and then clamped into position by the set-screws. The latitude and departure of each station are then read off, respectively, on the slotted side scales of the frame, and on the lateral scale, and noted down for each station, so as to supersede the use of the transverse tables, and admit the computation of any irregular piece of land inclosed by the lines plotted in accurate and reliable manner by the differences of the latitudes and departures so obtained.

By this instrument the quick and convenient plotting, in the office or field, of a survey may be obtained without the use of protractor, triangles, and scales, as these instruments are all embodied in my improved device.

Having thus described my invention, I claim as new and desire to secure by Letters Patent—

The combination of square frame A, having guide-slots in parallel sides, with a sliding lateral scale, D, having verniers at the ends and fastening clamp-screws, substantially as specified.

DANIEL F. HITT.

Witnesses:
PAUL GOEPEL,
CHAS. LURCOTT.